Nov. 26, 1968  E. R. LIEBERMAN  3,413,129
METHOD OF PRODUCING COLLAGEN SAUSAGE CASINGS AND PRODUCT
Filed Oct. 1, 1964  2 Sheets-Sheet 1

INVENTOR.
EMANUEL R. LIEBERMAN
BY
ATTORNEY

United States Patent Office 3,413,129
Patented Nov. 26, 1968

3,413,129
METHOD OF PRODUCING COLLAGEN SAUSAGE CASINGS AND PRODUCT
Emanuel R. Lieberman, Somerville, N.J., assignor to Johnson & Johnson, a corporation of New Jersey
Filed Oct. 1, 1964, Ser. No. 400,846
16 Claims. (Cl. 99—176)

ABSTRACT OF THE DISCLOSURE

A collagen casing for sausages of the weiner or frankfurter type is manufactured by extruding a mass of acid-swollen collagen fibrils obtained from animal hide and cellulose fibers into an ammonium sulfate coagulating bath, hardening the extruded casing in an aqueous solution containing from about 0.15 percent to 10 percent by weight of ammonium hydroxide and a non-toxic ammonium salt, plasticizing the hardened casing, drying the casing while inflated, heating the dried casing from 40° C. to 80° C. over a period of 8 to 12 hours, and then heating said casing for an additional 12 to 24 hours at about 80° C.

---

This invention relates to an improved collagen casing and more particularly to extruded collagen casings that have been treated with an aqueous solution of ammonium hydroxide.

While not limited thereto, the present invention is adapted to being utilized as a casing for sausages of the weiner or frankfurter type. Prior to the present invention, this type of sausage was either prepared by using expensive natural casings or inedible cellulose casing to contain the meat emulsion during the smoking and cooking process. The inedible cellulose casing must be removed by the manufacturer before the wieners are packaged for sale. The resulting product is known in the meat industry as a "skinless" wiener.

There has long been a need for an extruded collagen casing that would be edible, non-toxic and sufficiently strong to stand up under stuffing, linking, smoking, washing and cooking. It is now known that edible casings for pork sausage may be prepared by extruding a tubular body from a fluid mass of swollen collagen fibrils, hardening this tubular body in the wet state and drying the collagen casing so produced. A method of producing such collagen casings is described in U.S. Patent No. 3,123,482.

Extruded collagen casings that are suitable for the manufacture of fresh pork sausages may not be entirely satisfactory for the production of sausages of the wiener or frankfurter type. This is due to the differences in processing pork sausages and wieners. Thus, a meat emulsion of the pork sausage type may be stuffed, linked by twisting on a Famco linking machine, and packaged for sale without cooking. Sausages of the wiener or frankfurter type, however, are linked on a Ty linker, racked on a stick, smoked at temperatures from about 120° F. to about 170° F. or 180° F. for several hours, rinsed with hot water at about 180° F. to 190° F. for several minutes, and then rinsed with cold water for several minutes. The consumer may cook this product by "deep fat frying," i.e., the frankfurter is plunged into a cooking oil that has been heated to 350° F. Sometimes such frankfurters have been chilled or even frozen prior to such cooking, so that the casings are subjected to great thermal stresses and pressures from steam or vapor generation. It will be appreciated, therefore, that a collagen casing used in the production of frankfurters must of necessity have a high wet strength to survive the more vigorous treatment in the linker.

An additional requirement for the frankfurter casing is that the casing should not become wrinkled and lose bonding to the meat during smoking or the hot and cold rinses that follow smoking. In other words, the casing must be sufficiently elastic (not permanently deformed) so that the stress does not relax during the smoking-rinsing cycle. On chilling after smoking, the meat contracts slightly (becomes more dense) and the casing must also shrink or the finished product will have a poor appearance.

It is an object of the present invention, therefore, to produce a new and improved extruded collagen casing adapted to be utilized as a casing for sausages of the weiner or frankfurter type.

It is another object of the present invention to produce an edible casing that is exceptionally tender when eaten, yet sufficiently strong to survive linking in the Ty linker.

It is a further object of this invention to produce an edible collagen casing that will retain a smooth symmetrical appearance after smoking.

Still another object of this invention is to provide an edible collagen casing suitable for use with pork sausages or frankfurters that will not burst or peel off during cooking.

In accordance with the present invention, it has been discovered that a much improved wiener casing may be produced by the procedure described in U.S. Patent No. 3,123,482 if a dilute solution of ammonia is substituted for the alum hardening agent. The use of ammonia in place of alum produces a casing that is more fragile and difficult to process during the manufacturing process. Yet the difficulty in processing is more than compensated for by the improvement in appearance and in-use performance of the finished casing.

Numerous laboratory and field tests have demonstrated that when an ammonia solution is substituted for the alum hardening solution in the process identified above, the product obtained more closely resembles natural casing. This difference is particularly apparent after stuffing, linking, smoking and cooking.

The fluid mass of swollen collagen that is extruded to form the casings of the present invention may contain from about 3.2 percent to about 4 percent by weight of collagen (calculated on the basis of dry collagen weight) a non-collagenous filler such as cellulose or starch. If a fibrous filler such as cellulose is employed the amount may vary from about 5% to about 42% of the total solids present in the extrusion mixture. Smaller amounts of starch may be substituted for a part of or all of the cellulose.

The ammonia hardening bath may contain from about 0.15% to 10% ammonium hydroxide and from about 1% to 10% of a salt such as ammonium sulfate or ammonium lactate. To improve the wet tensile strength and elasticity of the ammonia hardened casing it is desirable to add a small amount of reducing sugar to the casing as described in U.S. Patent No. 3,151,990. The amount of reducing sugar employed, however, is only about one-tenth of the amount required to treat an alum hardened casing. Indeed, the sugar treatment may be eliminated entirely if the ammonia hardened casing is heat-cured for a prolonged period of time, i.e., about 24 hours at 80° F.

Suitable sugars for the treatment of ammonia hardened collagen casings are reducing sugars which have a free aldehyde or keto group that is not in glucoside combination with other molecules. Examples of such reducing sugars are erythrose, threose, arabinose, ribose, xylose, cyclose, fucose, mannose, glucose (dextrose), galactose, fructose (levulose), etc. These sugars may be most conveniently applied to the collagen casing in the form of dilute solutions. The amount of sugar present in solution is related to the dwell time of the casing in the solution and the reactivity of the sugar used, and may vary from about 0.005 percent to about 0.08%. It is preferred to add the reducing sugar to the plasticizing bath, which bath follows the washing step and is the last bath contacted before the casing is dried.

Alternatively, a smoke solution derived from wood smoke vapor may replace the reducing sugar in the plasticizing bath. Smoke flavoring solutions contain a large number of acetic, phenolic and carbonyl (aldehyde) compounds that will react with collagen and improve the physical properties of the ultimate casing. The chemical constituents of smoke flavoring are discussed in an article by Hollenbeck and Marinelli, Proceedings of the Fifteenth Research Conference, sponsored by the Research Council of the American Meat Institute Foundation of the University of Chicago, page 67 (1936). The smoke products identified in that article have been found useful in processing the ammonia hardened casings of the present invention.

The casing after it leaves the plasticizing bath is inflated and dried in a rapid stream of air and then heat cured in a forced draft oven, raising the temperature slowly from 40° C. to 80° C. during an 8 to 12 hour period. The heat treatment at 80° C. is continued for an additional 12 to 16 hours.

It will be understood that the foregoing general description and the following detailed description, as well, are exemplary and explanatory but do not restrict the invention.

The process for the manufacture of ammonia-cured collagen casings of the present invention may be more fully understood from the following detailed description and examples taken in connection with the accompanying drawings, wherein.

Figure 1:
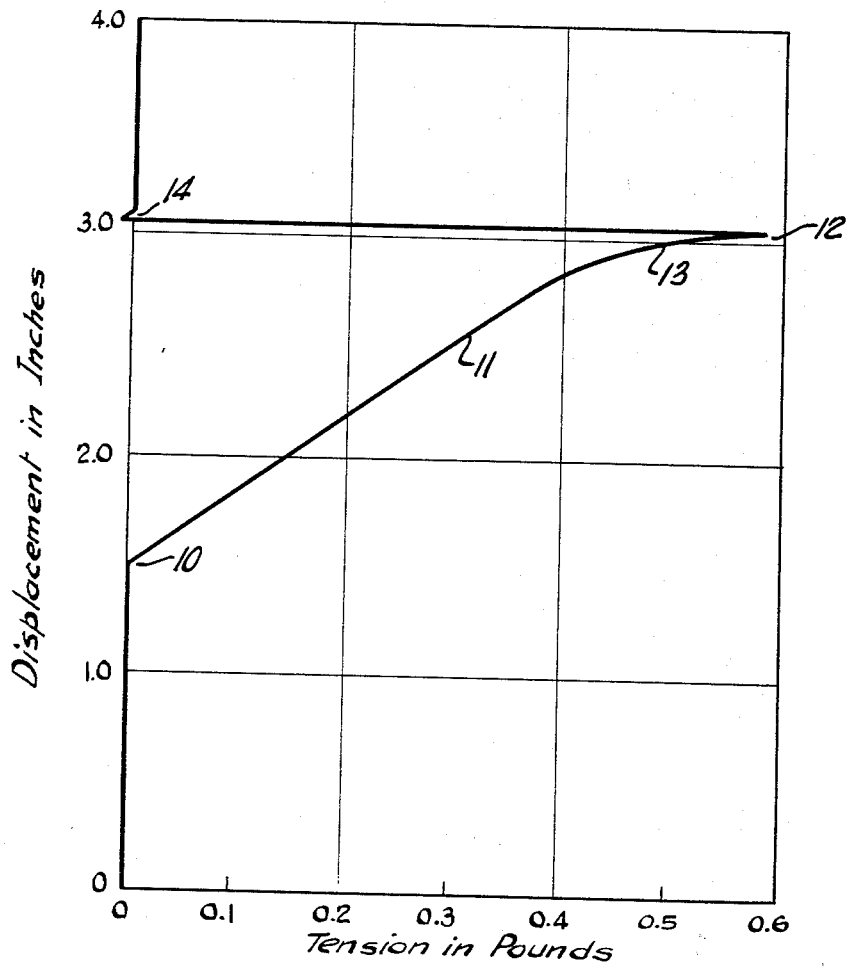
FIGURE 1 is a reproduction of a stress-strain curve of a typical collagen casing of the present invention obtained from an Instron Tensile Tester machine.

Throughout the specification and examples that follow, all quantities are expressed in parts by weight unless otherwise indicated.

EXAMPLE I

Preparation of ammonia hardened casing

Fresh steer hides are washed with cold water at 13° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and discarded. Composites are prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is desirable during the grinding process to keep the pulp below 20° C. This may be done by adding crushed ice to the hides as they are fed to the grinder.

Ten and six-tenths parts of this ground hide (27% hide solids) is next diluted with 27.2 parts of tap water at 16° C. to give 37.8 parts of a smooth slurry containing 7.6% dry solids. A 1.46% dispersion of hardwood cellulose is prepared by adding 2.75 parts cellulose to 186 parts of water and stirring the pulp for 2½ hours. At this point, there are no more cellulose fiber agglomerates and 36.82 parts of the dispersion is weighed out and mixed with 0.98 part of 88% lactic acid.

The cellulose dispersion containing lactic acid (37.8 parts total) is added to an equal weight of hide pulp, (37.8 parts) thoroughly mixed, and allowed to stand overnight. The mass of acid-swollen collagen fibrils and cellulose fibers is further dispersed in a suitable homogenizer such as a Manton-Gaulin homogenizer (Model 125-K-5BS) fitted with a two-stage valve, 1500 p.s.i. drop per stage. The swollen collagen mass so obtained is filtered through a 7-mil filter screen and extruded in the manner described in Example II of U.S. Patent No. 3,123,482 in the form of a tubular casing so that some collagen fibril orientation is transverse to the direction of extrusion. This may be partially accomplished by inflating the casing as it leaves the nozzle. One form of extruder found useful in practicing the invention is disclosed in U.S. Patent No. 3,122,788.

The rate of extrusion is such that about 9.4 cc. of the swollen collagen extrusion mass forms one foot of casing and the extruded tube is inflated in the extrusion column so as to have a lay-flat width of 35 mm. in the aqueous system.

This tube after it leaves the extrusion column is treated for 14 seconds with an aqueous ammonium sulfate bath containing 40% ammonium sulfate adjusted to pH 7.0 with ammonium hydroxide, and is then prewashed for 8 to 18 minutes with an ammonium sulfate solution of density 1.070 to 1.085 and pH 6.0 to 7.5.

The tubular casing is next treated for 8 to 18 minutes with an aqueous solution containing 1.3% ammonium hydroxide and 10% ammonium sulfate. The casing is next water-washed for 40 to 80 minutes and plasticized for 6 to 12 minutes with a solution containing 5% glycerol and 1% low viscosity carboxymethyl cellulose. The casing is inflated and dried in a rapid stream of air and then heat-cured in a forced draft oven, raising the temperature slowly from 40° C. to 80° C. during a 12 hour period. The heat treatment at 80° C. is continued for an additional 12 hours. The casing is then cooled and conditioned for one week or more at 75° F. and 60 to 75% relative humidity.

The casing made by the method described above is of uniform diameter and wall thickness. The casing wall is a smooth and continuous film about 1-mil in thickness and dispersed throughout the wall of the casing, may be noted, the cellulose fibers that were added to the original cowhide pulp in preparing the collagen mass. The collagen fibrils that make up the casing wall cohere to form a membrane having the glass-like quality of a hyaloid membrane, but unlike the hyaloid membrane which is transparent, the collagen membrane is translucent.

Physical properties of ammonia hardened casing

Typical casing made by the process described above are tested on an Instron Tensile Tester to determine certain physical properties. The Instron Tensile Tester is a machine which can apply a tensile load to a sample and simultaneously record on a moving chart the stress-strain curve of the sample under test. The Instron apparatus employed to obtain the data reported below was adapted to the testing of extruded collagen casings by enclosing the clamps of the instrument in an insulated box which could be filled with live steam to maintain the sample at 99° C. All casings tested at 99° C. are pretreated by soaking in a meat emulsion extract for three minutes. This extract is prepared in the following manner.

A mixture of 1 part by weight ground sausage meat and 2 parts by weight water is mixed thoroughly in a Waring Blendor and the water extract is separated from the meat by filtration. The meat emulsion extract so obtained is heated to the boiling point to coagulate certain water-soluble proteins and then filtered a second time to give a clear yellow solution that is used to pretreat the casings that are to be tested.

A 4-inch length of the casing which has been soaked for 3 minutes in the meat emulsion extract described above is clamped between the jaws of the Instron Tensile Tester in such a manner that the length of the casing suspended between the two jaws is 3 inches. The jaws of the Instron apparatus are then positioned 1 inch apart and live steam is admitted to the insulated box that surrounds the sample and jaws of the apparatus. The temperature of the casing sample being tested is maintained at 99° C. throughout the entire test procedure.

Three minutes after the steam is admitted to the insulated box that surrounds the casing sample being tested, the clamps of the Instron Tensile Tester are moved apart at the rate of 1 inch per minute until the casing breaks. While the jaws of the apparatus are in motion, the stress or tension exerted by the casing and the distance between the moving jaws is continuously recorded by a moving stylus on graph paper. FIGURE 1 is a reproduction of a typical stress-strain curve from an Instron Tensile Tester chart. It will be noted that the displacement along the oridnate corresponds to the distance separating the jaws of the machine in inches. The displacement along the abscissa corresponds to the load on the jaws or tension exerted by the casing in pounds.

Five important physical properties of the casing under test can be measured from a single stress-strain curve. It will be noted from FIGURE 1 that no tension is recorded until the clamps have moved 1.48 inches apart. This distance from the intersection of the X axis and the Y axis (no displacement) to point 10 is a measure of the length of the casing after steaming for 3 minutes and the original length (3 inches) minus the distance from the point of origin to point 10, is the change of length due to shrinkage, which throughout this specification will be referred to as ΔL. In FIGURE 1, ΔL is equal to 3 inches minus 1.48 inches or 1.52 inches.

From the slope of the line 10–11 in FIGURE 1, it will be noted that the strain in inches per pound of stress is 3.43. This value, which is related to the reciprocal of Young's modulus, will be referred to throughout the specification as $\epsilon$.

In FIGURE 1, point 12 indicates the sudden breaking point of the casing, the tension dropping suddenly to zero. The point 12 is a measure of the tension or applied force as the break point. The casing having the stress-strain curve illustrated in FIGURE 1 snapped under an applied force of 0.591 pound. The force required to break the casing under the test conditions described above will be referred to throughout this specification as the hot tensile strength.

The stylus trace 10–12 of FIGURE 1 passes through the point 13, at which point the distance between the clamps is equal to the original length of the casing suspended between the clamps (3 inches). The displacement of this point 13 from the Y axis is a measure of the tension exerted when the casing is stretched to its original length. This force, which in the test illustrated by FIGURE 1 amounts to 0.461 pound, will be referred to throughout this specification as the shrink tension.

The line 12–24 of FIGURE 1 intersects the Y axis at 3.04 inches, indicating that the casing measured 3.04 inches in length just prior to breaking. The length of the casing at the break point divided by the original length of the casing suspended between the clamps and multiplied by 100 (3.04 inches ÷ 3 inches × 100), will be referred to throughout the present specification as the percent recovery. In the test illustrated by FIGURE 1, the percent recovery of the casing is 101.

The Instron Tensile Tester may also be used to determine the swell, deformation, modulus and wet tensile strength of typical casings at room temperature. In this experiment, the casings tested are not treated with the meat emulsion. Test samples of the casing are prepared by cutting 2-inch sections, ½-inch wide, from the casing in such a manner that the long direction of the test sample (2 inches) is parallel to the axis of the casing. Other samples are prepared by cutting the 2-inch section in such a manner that the long dimension of the test sample is perpendicular to (across) the axis of the casing. In this way, the physical properties parallel and perpendicular to the direction of extrusion of the casing may be determined.

A 2-inch section of casing ½-inch wide is clamped between the jaws of the Instron Tensile Tester in such a manner that the length of the casing suspended between the two jaws is 1 inch. The jaws of the Instron Tensile Tester are then positioned 1 inch apart and the casing sample is sprayed with distilled water.

Two minutes after the test sample has been soaked with water, the clamps of the Instron Tensile Tester are moved apart at the rate of 1 inch per minute until the distance between the moving jaws is 1.22 inches. The movement of the jaws is then stopped.

Figure 2:
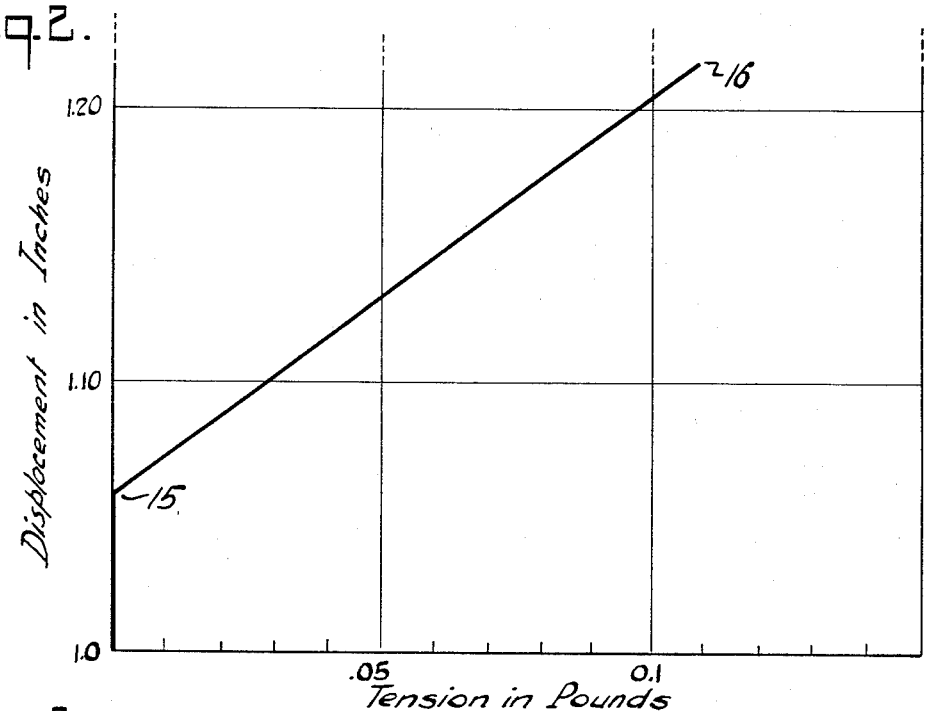
FIGURES 2 and 3 are similar stress-strain curves but differ from FIGURE 1 in the size and temperature of the casing sample tested.

The stylus trace 15–16 of FIGURE 2 is a reproduction of a typical stress-strain curve from an Instron Tensile Tester chart obtained with a wet casing stretched from 1 inch to 1.22 inches at room temperature. It will be noted that no tension is recorded until the jaws have moved 1.057 inches apart (point 15). This distance (1.057 inches) is the length of the casing after it has been wet with water and this distance, minus the original length (1 inch) times 100, is the present swelling that takes place when the casing is wet out. From FIGURE 2, the percent swelling may be calculated as equal to 1.057 inches minus 1 inch times 100 or 5.7.

From the slope of the line 15–16 in FIGURE 2, it will be noted that the strain in inches per pound of stress is 1.48. This value, which is related to the reciprocal of Young's modulus will be referred to throughout the specification as M (the modulus of the wet casing at room temperature).

The jaws of the Instron Tensile Tester are next reversed so that they approach to within 1 inch, releasing all tension and then the jaws of the Instron Tensile Tester are again moved apart at the rate of 1 inch per minute until the casing breaks. The third stress-strain curve so obtained is illustrated by FIGURE 3, from which curve one may measure the deformation and wet tensile strength.

Figure 3:
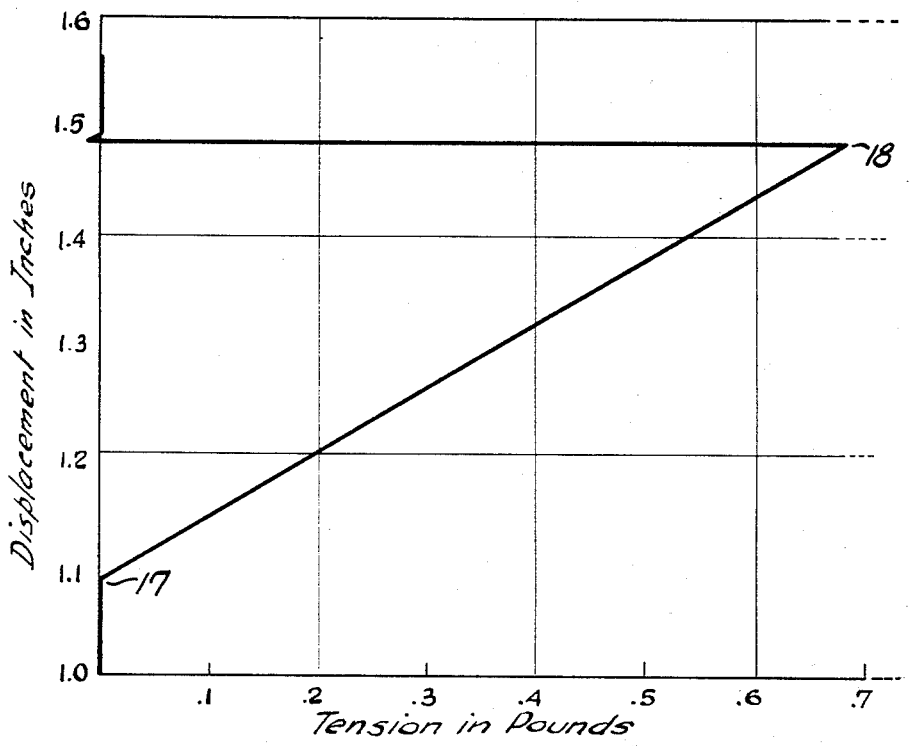

It will be noted from FIGURE 3 that no tension is recorded until the clamps have moved 1.088 inches apart (point 17). This distance is the measure of the length of the casing after it has been wet out, stretched 22 percent and then relaxed. This distance minus the original length (1 inch) is the change of length due to both swelling and deformation under stress and throughout the specification and claims will be referred to as combined swell and deformation.

The percent deformation may be calculated from FIGURES 2 and 3 by subtracting the length of the sample after swelling (indicated at point 15 of FIGURE 2) from the length of the sample after it has been wet out, stretched 22 percent and relaxed (point 17 of FIGURE 3). Thus the percent deformation of the sample illustrated by FIGURES 2 and 3 is percent deformation equals 1.088 minus 1.057 times 100 or 3.1.

In FIGURE 3, point 18 indicates the sudden breaking point of the casing, the tension dropping suddenly to zero. This point 18 is the measure of the tension or applied force at the break point. The casing having the stress-strain curve illustrated in FIGURE 3 snapped under an applied force of 0.680 pound. The force required to break the wet sample at room temperature under the test conditions described above will be referred to throughout this specification as the wet tensile strength.

Typical casings of the present invention have the following illustrative properties when tested on an Instron Tensile Tester as described above.

The change of length due to shrinkage ΔL amounts to from about 1.0 inch to about 2.0 inches.

The strain in inches per pound of stress, $\epsilon$, is from about 1.0 to about 10.0 inch-pounds. This test is carried out at 99° C.

The hot tensile strength is from about 0.3 pound to about 1.4 pounds.

The shrink tension is from about 0.3 to about 1.0 pound.

The percent recovery amounts to from about 80 to about 150.

The combined swell and deformation which is most important to the stuffing and linking properties of the casing is from about 5.5% to about 16%.

The modulus at room temperature, M, (measured either perpendicular or parallel to the direction of extrusion) is from about 0.3 to about 1.5 inch-pounds.

The wet tensile strength (measured either perpendicular or parallel to the direction of extrusion) is from about 0.7 pound to 1.7 pounds. This test is conducted at room temperature.

The burst strength is at least about 10 to 28 pounds per square inch. Burst strength is the air pressure in pounds per square inch required to burst dry extruded collagen casings which have a wall thickness of 1 mil. The values of burst strength expressed in this specification are determined in a Perkins Mullen Tester (Model C). Liquid under uniformly increasing pressure expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material, uniformly distributes the pressure over the entire test area, and protrudes into any imperfection or weak section to burst or rupture it at that point. When the pressure drops at the moment of rupture, a maximum hand on the gauge remains stationary to indicate the exact pressure at the time the burst occurred.

It has been noted that the wet tensile strength of a collagen casing is markedly affected by the meat emulsion with which the casing is stuffed, and that a more significant value for the wet tensile strength may be obtained if the casing is treated prior to testing with a citrate-stearate buffer. Throughout the specification tensile strength determinations made by the following procedure will be referred to as the buffered wet tensile strength.

The buffered wet tensile strength of the casing is determined by folding a length of casing, approximately 5 inches, once lengthwise so as to form a ribbon approximately ¼" to ½" wide and 5 inches long. This is firmly attached to a Chatillon maximum recording spring gauge and a motor driven jaw using felt covered clamps so as to avoid damaging the film. Approximately 1" to 1.5" of the folded casing is suspended between the spring gauge and the jaw and is subjected to the tensile test. The length of casing suspended between the spring gauge and the motor driven jaw is softened by treatment with a buffer solution prepared by dispersing two parts of sodium citrate and ½ part of sodium stearate in 1,000 parts of water and adjusting the pH to 7.5 with citric acid. This solution simulates the effect of contact with meat emulsion.

Sixty seconds after the film is wet with the citrate stearate buffer, the motor driven jaw is extended at the rate of about 0.2 inch/second until the film breaks. The average maximum force recorded, the "buffered wet tensile strength," for the product of Example I is 4.0 pounds.

The elasticity of the casing of Example I is determined by clamping a 10 inch section of the casing so that 200 grams force may be applied to the flattened tube. The tube is soaked in the citrate stearate buffer identified above for 30 seconds while under a tension of 200 grams and is then subjected to a force of 800 grams for 30 seconds. At this time the length of the stretched casing is recorded. The stress is removed and the length again recorded allowing 30 seconds for elastic recovery. The difference between the length of the stretched casing and its length 30 seconds after the stress is removed is recorded as the elasticity of the casing. The elasticity of the produce described above (average of 5 determinations) is 1.9 inches.

The tendency of this casing to burst and separate from the frankfurter when dropped into hot oil may be determined by the following test:

Two short sections of casing are cut lengthwise to form two films that are rinsed in tap water for 30 seconds. The two wet films are smoothed and wiped to remove excess water and then clamped together between metal plates. A hole ⅝" in diameter is located in the center of each metal plate so that when the plates are clamped together the holes are in register and expose both layers of collagen film.

The clamped assembly containing the film is immersed in hot cooking oil for four minutes to vaporize the water absorbed by the film. The rate of vaporization is dependent upon the temperature of the hot oil, and the film will burst if the rate of vaporization significantly exceeds the rate at which water escapes through the film. Films from the collagen casing of this example which contain about 20% by weight cellulose fibers based upon the collagen solids burst in oil that has been heated to 320° F. but do not burst at 300° F.

Use of the ammonia hardened casing

The casing of this Example I is stuffed with a standard frankfurter emulsion, and Ty-linked. The frankfurters so obtained are smoked as follows:

The links are placed in an oven at room temperature. Air circulation is provided at a velocity of 200 f.p.m. and steam introduced until the wet bulb temperature reaches 123° F. This wet bulb temperature is maintained and the dry bulb temperature is raised to 140° F. during the next 40 minutes. At this point hardwood smoke is introduced and the temperature raised to 125° F. wet bulb and 132° F. dry bulb. These conditions are maintained for 30 minutes and then the temperature is raised to 165° F. dry bulb and 140° F. wet bulb for 15 minutes. The smoke treatment is then discontinued and the links are sprayed with water at 160° F. and then steamed at 165° F. for 20 minutes. The links are finally cooled to 80° F. with cold water spray and removed to a cold room to chill overnight.

EXAMPLE II

A casing is prepared in exactly the same way as described in Example I above except that the casing is subjected to a longer heat-cure cycle. The casing from the plasticizing bath is inflated and dried in a rapid stream of air. It is heat-cured in a forced draft oven raising the temperature slowly from 40° C. to 80° C. over a 12 hour period and continuing the heat treatment for an additional 24 hours. In this case the buffered wet tensile strength is 5.3 pounds and the "elasticity" is 1.5 inches. This casing also gave satisfactory stuffing, linking, smoking and cooking results when used under the conditions described in Example I above.

EXAMPLE III

This casing was prepared exactly as described in Example I except that a 3.2% dispersion of hardwood cellulose is prepared instead of the 1.46% dispersion by adding 6.0 parts of cellulose to 181 parts of water. The ammonia hardening bath used contains 0.7% ammonium hydroxide instead of 1.5% and 5% ammonium sulfate instead of 10%.

This casing has a buffered wet tensile strength of 4.2 pounds and an elasticity of 1.5 inches. This casing also gives satisfactory stuffing, linking, smoking and cooking results under the conditions described in Example I.

EXAMPLE IV

This casing is prepared by the procedure of Example I substituting a 3.2% dispersion of cellulose for the 1.42% cellulose dispersion. The ammonia hardening bath contains 0.15% ammonium hydroxide and 5% ammonium sulfate.

This casing has a buffered wet tensile strength of 4.2 pounds and an elasticity of 1.7 inches. This casing also gives satisfactory stuffing, linking, smoking and cooking results under the conditions described in Example I.

EXAMPLE V

This casing is prepared by the procedure of Example I with a 3.2% dispersion of cellulose (42% cellulose based on the collagen solids). The collagen mass is extruded at the rate of 7.4 grams per foot of casing instead of 9.4 grams per foot, and the ammonia bath contains 0.5% ammonium hydroxide and 5% ammonium sulfate.

This casing has a buffered wet tensile strength of 4.2 pounds and an elasticity of 1.5 inches. This casing also gives satisfactory stuffing, linking, smoking and cooking results under the conditions described in Example I.

EXAMPLE VI

A sugar-cured collagen casing is prepared by the procedure of Example I with a 3.2% dispersion of cellulose. The collagen mass is extruded at the rate of 7.4 grams per foot of casing. The ammonia hardening bath contains 0.5% ammonium hydroxide and 5% ammonium sulfate. The plasticizing bath contains 0.085% dextrose in addition to 5% glycerol and 1% carboxymethyl cellulose.

This casing has a buffered wet tensile strength of 5.2 pounds and an elasticity of 1.1 inches. This casing also gives satisfactory stuffing, linking, smoking and cooking results under the conditions described in Example I. Sausages made with the casing of this example may be deep-fat fried in hot oil at 340° F. without rupture of the casing.

EXAMPLE VII

This casing is prepared by the procedure of Example I with a 3.2% dispersion of hardwood cellulose. The ammonia hardening bath contains 0.7% ammonium and 5% ammonium sulfate. The plasticizer bath contains 0.02% dextrose in addition to 5% glycerol and 1% carboxymethyl cellulose.

This casing has a buffered wet tensile strength of 4.8 pounds and an elasticity of 1.6 inches. This casing also gives satisfactory stuffing, linking, smoking and cooking results under the conditions described in Example I.

EXAMPLE VIII

This casing is prepared by the process described in Example I with a 3.2% dispersion of hardwood cellulose. The ammonia hardening bath contains 10% ammonium hydroxide and 10% ammonium sulfate. The plasticizer bath contains 0.08% dextrose, 5% glycerol and 1% carboxymethyl cellulose. The casing is inflated and dried in a forced draft oven raising the temperature slowly from 35° C. to 80° C. during an 8 to 12 hour period. The heat treatment is continued for an additional 16 hours.

This casing has a buffered wet tensile strength of 5.8 pounds and an elasticity of 1.7 inches. This casing also gives satisfactory stuffing, linking, smoking and cooking results under the conditions described in Example I.

EXAMPLE IX

This casing is prepared by the process described in Example I except that the plasticizer bath contains a smoke solution derived from wood smoke vapor, 0.2% sodium bicarbonate, 5% glycerol and 1% carboxymethyl cellulose. This casing is air-dried but is not subjected to a heat-cure treatment.

This casing has a buffered wet tensile strength of 7.1 pounds and an elasticity of 1.15 inches. This casing also gives satisfactory stuffing, linking, smoking and cooking results under the conditions described in Example I.

EXAMPLE X

This casing is prepared by the process described in Example I except that the plasticizer bath contains 0.5% of a smoke solution derived from wood smoke vapor, 0.2% sodium bicarbonate, 5% glycerol and 1% carboxymethyl cellulose. The casing is air-dried but is not subjected to a heat-cure treatment.

This casing has a buffered wet tensile strength of 7.0 pounds and an elasticity of 1.1 inches. This casing also gives satisfactory stuffing, linking, smoking and cooking results under the conditions described in Example I.

EXAMPLE XI

This casing is prepared by the process described in Example I except that the plasticizer bath contains 1.0% of a smoke solution derived from wood smoke vapor, 0.2% sodium bicarbonate, 5% glycerol and 1% carboxymethyl cellulose. The casing is air-dried but is not subjected to a heat-cure treatment.

This casing has a wet tensile strength of 7.0 pounds and an elasticity of 0.80 inch. This casing also gives satisfactory stuffing, linking, smoking and cooking results under the conditions described in Example I.

EXAMPLE XII

This casing is prepared by the procedure of Example I except that the cellulose dispersion used to prepare the extrusion mass is made up to contain 2.5% cellulose instead of 1.46% cellulose. This casing is extruded, finished, and cured in a forced draft oven raising the temperature slowly from 40° C. to 80° C. over a 12 hour period and continuing the heat treatment for an additional 24 hours.

This casing has a buffered wet tensile strength of 5.35 pounds and an "elasticity" of 1.45 inches.

This casing gives satisfactory stuffing, linking, smoking and cooking results with frankfurter emulsion.

EXAMPLE XIII

Limed split hides are reduced to pieces less than ½ sq. ft. in area and neutralized with 2 parts dilute acetic acid to 1 part hide. These hide pieces, 5000 parts, are gently agitated for 16 hours at 25° C. with a dilute aqueous solution containing 100 parts of glacial acetic acid.

The neutralized hides are washed twice with 30 minutes agitation with tap water and then treated with 10,000 parts of an enzyme solution containing 0.1% ficin and 0.3% disodium ethylene diamine tetraacetic acid for 24 hours at 25° C. The hides are again washed twice with water and the enzyme deactivated with 10,000 parts 0.1% $H_2O_2$ for two hours. The peroxide solution is then washed out and the hides comminuted and used to prepare an extrusion mass of acid-swollen unlimed collagen fibrils as described in Example I above except that the extrusion mass was homogenized in the Manton-Gaulin homogenizer at a total pressure of 2,000 p.s.i. instead of 3,000 p.s.i.

The collagen mass is extruded by the procedure described in Example I into an ammonia hardening bath containing 2% ammonium hydroxide and 5% ammonium sulfate. The plasticizer bath contains 0.1% dextrose, 5% glycerol and 1% carboxymethyl cellulose. The casing is heat-cured as described in Example I.

The casing gives satisfactory stuffing, linking, smoking and cooking results with frankfurter meat emulsion.

EXAMPLE XIV

The collagen extrusion mass described in Example XIII above is extruded at the rate of 6.0 grams of the collagen mass per foot of casing. The casing so obtained has a lay-flat width of 28 mm. The plasticizer bath contains 0.02% dextrose, 5% glycerol and 1% carboxymethyl cellulose. The casing is heat-cured as described in Example I.

EXAMPLE XV

This casing is prepared by the procedure of Example I using a 3.2% cellulose dispersion and extruding the collagen mass at the rate of 6 grams per foot of casing.

The casing so obtained is hardened in an aqueous solution containing 0.7% ammonium hydroxide and 5% ammonium sulfate. This casing has a lay-flat width of 28 mm. and gives satisfactory stuffing, linking, and cooking results with fresh pork sausage emulsion.

While the invention has been described in detail according to the preferred manner of carrying out the process and yielding the products, it will be obvious to those skilled in the art, after understanding the invention, that changes and modifications may be made therein without departing from the spirit or scope of the invention and it is intended in the appended claims to cover such changes and modifications.

What is claimed is:

1. In the method of producing collagen sausage casings, the steps of:
   extruding a tubular body from a fluid mass of swollen collagen obtained from animal hide;
   hardening the tubular body by applying thereto an aqueous solution containing from about 0.15 percent to 10 percent of ammonium hydroxide and a non-toxic ammonium salt;
   drying the ammonia hardened body; and,
   heating said body at about 80° C. for about 12 hours to about 24 hours.

2. In the method of producing collagen sausage casings, the steps of:
   extruding a tubular body from a fluid mass of swollen collagen obtained from animal hide;
   hardening said body in an aqueous solution containing from about 0.15 percent to 10 percent of ammonium hydroxide and a non-toxic ammonium salt;
   applying a solution containing from about 0.005 percent to about 0.08 percent of a reducing sugar to said body; and,
   heating said body at about 80° C. for about 16 hours.

3. In the method of producing collagen sausage casings, the steps of:
   extruding a tubular body from a fluid mass of swollen collagen obtained from animal hide;
   hardening said body in an aqueous solution containing from about 0.15 percent to 10 percent of ammonium hydroxide and a non-toxic ammonium salt;
   applying a solution containing about 0.005 percent to about 0.08 percent of a reducing sugar to said tubular body;
   drying said body while inflated and by heating from about 35° C. to about 80° C. for about 8 hours; and,
   heating said body for an additional time of about 12 to 16 hours at about 80° C.

4. In the method of producing collagen sausage casings, the steps of:
   extruding a tubular body from a fluid mass of acid-swollen collagen obtained from animal hide;
   hardening said body in an aqueous solution containing from about 0.15 percent to 10 percent of ammonium hydroxide and a non-toxic ammonium salt;
   water-washing the hardened body;
   immersing the washed, hardened body in a plasticizing solution containing from about 0.005 percent to about 0.08 percent of a reducing sugar;
   drying said body by heating from about 35° C. to about 80° C. for about 8 hours; and,
   heating said body for an additional time of about 16 hours at about 80° C.

5. In the method of producing a tubular collagen sausage casing, the steps of:
   extruding a tubular body from a fluid mass of swollen collagen fibrils obtained from animal hide having a collagen solids content in the range of about 3.2 percent to about 4.0 percent by weight;
   immersing said body in a solution of ammonium sulfate to coagulate the collagen therein;
   immersing the coagulated body in an ammonium hydroxide solution containing from about 0.15 percent to 10 percent of ammonium hydroxide and a non-toxic ammonium salt to harden the body and render it resistant to softening by water;
   water-washing the hardened body;
   immersing the washed, hardened body in a plasticizing solution containing from about 0.25 percent to about 1.0 percent of a solution of natural wood smoke flavor; and,
   drying said body.

6. In a method of producing collagen sausage casings, the steps of:
   extruding a mass of swollen collagen fibrils obtained from unlimed animal hide in the form of a tubular body into a solution of ammonium sulfate;
   applying a solution containing from about 0.15 percent to about 10.0 percent of ammonium hydroxide and a non-toxic ammonium salt to said body;
   heating the ammonia hardened body from about 35° C. to about 80° C. for about 8 hours; and,
   heating said body for an additional 16 hours at about 80° C.

7. In a method of producing collagen sausage casings, the steps of:
   extruding a tubular body from a fluid mass of swollen collagen fibrils obtained from animal hide;
   hardening said body while in the wet state by immersing it in an aqueous solution containing from about 0.15 percent to 10 percent of ammonium hydroxide and a non-toxic ammonium salt;
   applying a solution containing a plasticizer and from about 0.005 percent to about 0.08 percent of a reducing sugar to said body;
   drying said hardened and plasticized body; and,
   subjecting the dried body to a temperature of about 80° C. for about 16 hours.

8. An edible translucent ammonia hardened collagen sausage casing comprising cohered collagen fibrils obtained from animal hide and characterized by the presence throughout said article of from about 5 percent to about 42 percent by weight of a non-collagenous filler selected from the group consisting of cellulose and starch.

9. The casing of claim 8, wherein said filler is cellulose fibers.

10. An edible sausage casing comprising 5 percent to 42 percent of a non-collagenous filler selected from the group consisting of cellulose and starch encapsulated in a matrix of hide collagen fibrils obtained from animal hide cohered to form a translucent hyaloid structure and hardened with ammonium hydroxide and a non-toxic ammonium salt.

11. An edible ammonia hardened and heat-cured translucent collagen sausage casing obtained from animal hide and characterized by a buffered wet tensile strength greater than 4.0 pounds and a combined swell and deformation of no less than 5.5 percent and no more than 16 percent.

12. The casing of claim 11 in a shirred condition.

13. An edible sausage that may be cooked in hot oil at 340° F. without bursting comprising a collagen tube of ammonia hardened cohered hide collagen fibrils obtained from animal hide, said collagen tube being filled with an edible meat product.

14. An edible ammonia hardened and sugar-cured collagen sausage casing obtained from animal hides characterized by a buffered wet tensile strength greater than 4.0 pounds and a combined swell and deformation of no less than 5.5 percent and no more than 16 percent.

15. In a method of producing collagen sausage casings, the steps of:
   extruding a mass of swollen collagen fibrils obtained from limed animal hide in the form of a tubular body into an ammonium sulfate solution;
   applying a solution containing from about 0.15 percent to about 10.0 percent of ammonium hydroxide and a non-toxic ammonium salt to said body to harden said body;

heating the ammonia hardened body from about 40° C. to about 80° C. for about 8 hours; and, heating said body for an additional 16 hours at about 80° C.

16. An edible translucent ammonia hardened collagen sausage casing comprising cohered unlimed collagen fibrils obtained from animal hide and characterized by the presence throughout said article of from about 5 percent to about 42 percent by weight of a non-collagenous filler selected from the group consisting of cellulose and starch.

References Cited
UNITED STATES PATENTS

| | | | |
|---|---|---|---|
| 3,123,482 | 3/1964 | Lieberman | 99—176 |
| 3,123,653 | 3/1964 | Lieberman | 99—176 X |
| 3,151,990 | 10/1964 | McKnight | 99—176 |

HYMAN LORD, *Primary Examiner.*